United States Patent [19]

Sliwkowski

[11] 4,451,895

[45] May 29, 1984

[54] INTERACTIVE COMPUTER AIDED DESIGN SYSTEM

[75] Inventor: Joseph Sliwkowski, Sudbury, Mass.

[73] Assignee: Telesis Corporation of Delaware, Inc., Wilmington, Del.

[21] Appl. No.: 501,550

[22] Filed: Jun. 9, 1983

Related U.S. Application Data

[63] Continuation of Ser. No. 167,821, Jul. 17, 1980.

[51] Int. Cl.³ .......................... G06F 3/37; G06F 3/153
[52] U.S. Cl. .................................... 364/521; 364/188; 340/712; 340/707; 340/708; 340/717; 340/794
[58] Field of Search ............... 364/491, 515, 518, 521, 364/523, 188, 200, 900; 340/711, 712, 706, 707, 708, 717, 727, 724, 794, 797

[56] References Cited

U.S. PATENT DOCUMENTS

| | | | |
|---|---|---|---|
| 3,852,721 | 12/1974 | Tucker et al. | 364/200 |
| 3,973,245 | 8/1976 | Belser | 364/200 |
| 4,195,338 | 3/1980 | Freeman | 364/200 |

OTHER PUBLICATIONS

'A Brief, Personal History of Computer Graphics' by C. Machover, Computer, vol. 11, No. 11, Nov. 1978.
IBM Tech. Discl. Bul., vol. 21, No. 3, Aug. 1978, 'Cursor Selection of a Segment Within a Bounded Area on an Electronic Display Surface' by Bamford et al.
'Dual Display System for Multidimensional Data Analysis' by Hattori et al., Jap. Jor. of Applied Physics, vol. 21, No. 2, Feb. 1982.

*Primary Examiner*—Charles E. Atkinson
*Assistant Examiner*—William G. Niessen

*Attorney, Agent, or Firm*—Weingarten, Schurgin, Gagnebin & Hayes

[57] ABSTRACT

A computer aided design system which results in reduced operator fatigue, increased speed, and increased accuracy features a single workspace for inputting information, such as type of drafting exercise, graphic element or symbol, element position established either by element coordinate designation or cursor tracking and alpha/numeric keyboard-like entries. The system utilizes dual CRT screens, one, the graphics screen, for viewing the end product of the graphic design and the other, the function screen, for providing a single workspace for entering data. In one embodiment, input data either in the form of fixed format blocks or sequentially presented menus are displayed to the operator at the function screen so that he may select appropriate inputs with a light pen. Because all types of inputs are accomplished at a single workspace, the single workspace function screen avoids eye and arm fatigue so that the operator (i.e. draftsman or engineer) may comfortably and more accurately create the finished product with a minimum of eye, arm and mental operations. The advantages of the single workspace in terms of error reduction and fatigue reduction are complemented by displaying status messages at the function screen so that the operator need not look elsewhere to ascertain the accuracy or status of his input. The single workspace system requires that the operator only point as opposed to making other types of entries in order to create his design. In one embodiment a valid input is indicated by the lifting of the pen once a menu selection or pick has been established thereby to give the operator time to ascertain whether his menu pick is correct. Image reversal is also used to indicate the portion of the menu selected during the menu pick operation.

11 Claims, 9 Drawing Figures

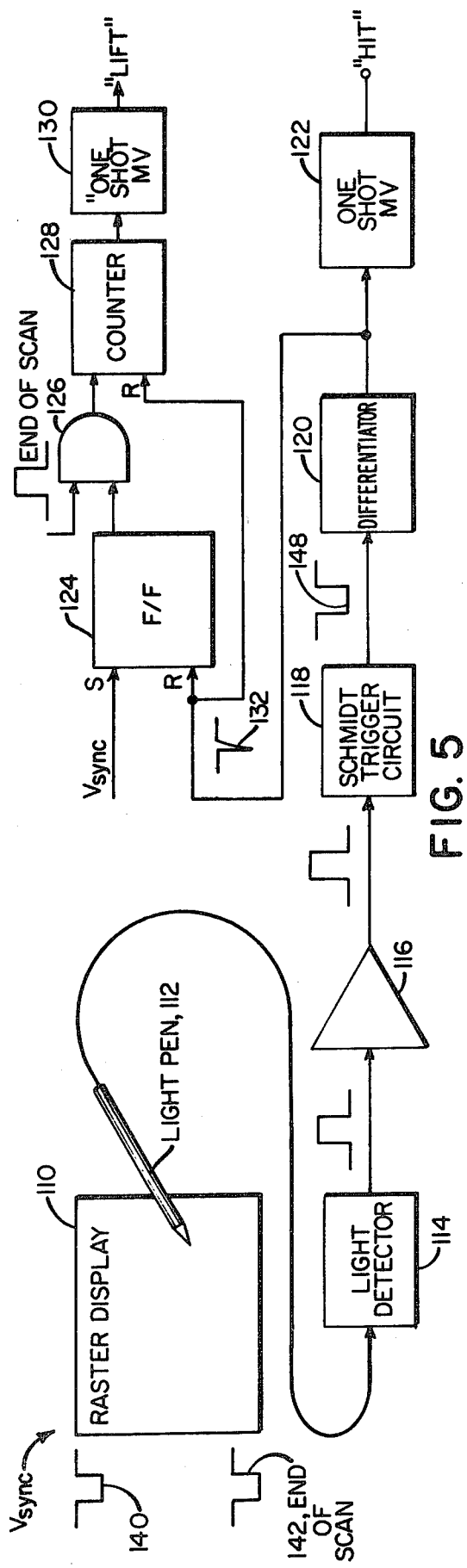
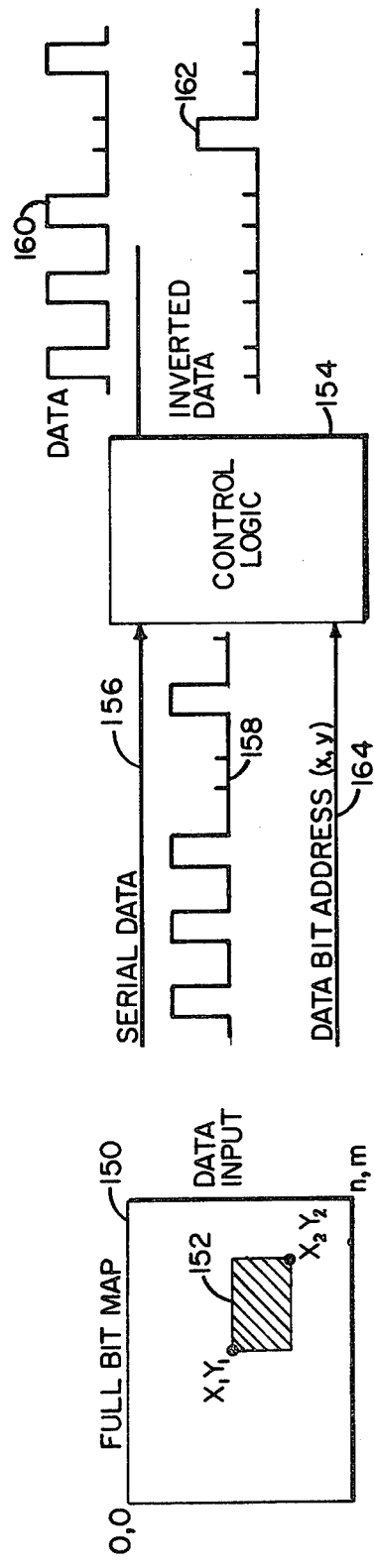
FIG. 5
FIG. 6

INTERACTIVE COMPUTER AIDED DESIGN SYSTEM

This application is a continuation of application Ser. No. 167,821, filed July 17, 1980.

FIELD OF INVENTION

This invention relates to computer aided design and computer aided manufacturing systems and more particularly to a system which alleviates operator fatigue, reduces errors in the creation of a design, and increases speed.

BACKGROUND OF THE INVENTION

Computer-based graphic design systems, available for some time, have utilized stand-alone computers, minicomputers, intelligent terminals, the concept of distributed computing, high resolution graphic displays, and sophisticated graphics software packages, plotters and digitizers which make the task of graphical design considerably simpler. The utilization of computer graphics provides users with as much as a ten-fold increase in productivity. One designer can now accomplish in hours what used to take days. Error free, concise computer based drawings can be quickly made from designs created on cathode ray tube (CRT) screens by a designer assisted by thousands of software aids that do the tedious work for him. Designs can be changed quickly and accurately and different configurations of products can be shown in simulated full three dimensional views.

While computer aided design or manufacturing (CAD/CAM) systems have in the past achieved the above results with terminals involving CRT screens and electronic pen inputting devices, in order to achieve maximum flexibility, prior art systems have utilized additional keyboards or multiple geographically separated inputting devices in order to accommodate desired input functions of identifying cursor positions, selection of graphic symbols and locations from plural menus and entry of alpha/numeric data.

Systems utilizing geographically separated input devices include the Applicon Video PCB system utilizing inputting devices at three geographically separate locations, Computervision's DESIGNER V SYSTEM with inputting devices at four separate locations and the Calma GDS II system involving three separate inputting devices all at different locations.

It will be appreciated that with a number of different inputting devices, the operator must not only function as a draftsman but also as a computer programmer and keyboard operator in order to achieve his final product. Since the typical system operator is not normally trained in this fashion, prior art systems with multiple input devices result not only in the operator having to utilize devices with which he is not familiar, such as keyboards, but also require that he utilize both hands in an unfamiliar fashion during the designing process. The utilization of both hands for inputting complex data is awkward, time consumming and results in acts which are not natural for the conventionally trained draftsman. Moreover, with the utilization of multiple input type devices, the draftsman must engage in a certain amount of mental gymnastics in order to achieve the appropriate design.

Additionally, in some prior art systems, feedback information is displayed on the main graphics CRT such that when the operator is creating his design his eyes are constantly shifting between the multiple input work space and the main graphics CRT in order to ascertain whether or not he is operating the system properly. Thus, in addition to arm fatigue and a lack of facility with a non-drawing hand, the operator is faced with an eye fatigue problem in which his eyes must constantly shift from the main screen to the multiple input work space.

In short, while computing techniques currently exist which enable extraordinary flexibility in the creation of designs, the problem is man-machine compatibility so that an operator can operate efficiently and in an error free mode for extended periods of time. It is important that the computers be instructed by the operator utilizing skills which he has in his repertoire and without having to teach him either computer programming or efficient keyboard entry. The computer aided design system must be simple to use and give the operator immediate feedback to enable him to work at faster speeds with less error.

In summary, in the prior art, with a typewriter keyboard for inputting alphabetic characters, a keypad for introducing numeric characters and a pointing system for choosing functions, such systems are difficult to use and result in operator fatigue in as little as twenty minutes.

SUMMARY OF THE INVENTION

The subject computer aided design system, in contrast to the prior art systems, utilizes dual CRTs and only one work space which is keyboardless and in which all information is placed on a function screen which is flush with the workspace to allow the operator to input the desired multi-format information by merely pointing, as with a light pen, to displayed fixed format information or information from a selected menu. The types of information which may be entered into the system include: type of drafting exercise; graphical element or symbol to be drawn; and, element position. Element position can be specified alpha/numerically or by pen position in a cursor track mode. As such the information displayed can take on different formats. In one embodiment, status messages are flashed on this function screen so that the operator's eyes need not leave the function screen to obtain instantaneous information about his input. In another embodiment, image inversion is used so that there is an immediate indication of what information has been entered.

As to the two CRTs provided, one functions as the "graphics" screen which provides an on-going record of the composition which the operator is creating, while the other serves as a "function" screen on which is portrayed in either fixed or sequential fashion all of the information which is necessary for him to pick and therefore enter into the computing system. This is accomplished by the utilization of a so-called "light pen" which permits the operator in a single handed operation to pick from the data, provided either as a simulated and labeled keypad or as a "menu" on the screen, what information is to be utilized by the computer in order to complete the design. There is no separate keyboard for entering alphabetic characters, nor is there a separate keypad for entering numerical values, but rather all information that is necessary for the proper functioning of the computer aided design system is selected with one hand directly from the function screen at a single work space.

The only operation that the operator need accomplish is a pointing function which is one which is quite similar to writing. The result is an increase in speed and a decrease in both arm and eye fatigue. As important, the operator is not required to utilize a hand which he is not used to using, i.e. the non-drafting hand.

The subject system thus results in a higher degree of man-machine interaction with the operator's attention not divided between a plurality of spatially separate inputs. Operator fatigue is dramatically reduced due to the simplicity of the system, with immediate feedback being provided on the function CRT, again resulting in the operator being able to more quickly verify his input which enables the entire process to go faster. Error reduction is simultaneously achieved both because of the single work space and because of the feedback. Moreover because of the utilization of a CRT as the input device, the system permits an infinite library of symbols and unlimited menus to be presented in a scroll-like manner which also increases accuracy and speed. Not only can the operator vary the page presentation on the screen but also the menu combinations may be varied so that a menu can be compiled locally or the operator can in fact invent his own menu.

In one embodiment, the system is provided with a point and pick feature in which an input is only recorded when, after the operator has picked a given menu item, he lifts the pen. This is similar to allowing a chess move only after the chess player has removed his hand from the chess piece. What this allows is mental verification of a particular menu pick while the pen is at the pick site, with a menu pick only being recorded upon the lifting of the pen. This reduces error and in fact also increases the speed of the design process. Image inversion, i.e. changing from white on black to black on white at the pen selection site also reinforces an established pen pick selection.

It will be appreciated that while the system has been described in terms of one-handed operation, and while it is recognized that the non-drawing hand can input complex information only with difficulty such as alphanumeric data or menu selections, it is nonetheless within the scope of this invention that control switches within or closely adjacent to the single work area may be utilized for such overriding control purpose as "end of command" or to switch from a menu mode to a cursor mode in which symbols are moved about on the graphics screen in accordance with the position of a light pen on the function screen.

DESCRIPTION OF THE DRAWINGS

These and other features of the present invention are more fully described below in the detailed description, and in the accompanying drawings of which:

FIG. 5 is a schematic diagram illustrating a light pen hit/lift detector as used in the present invention; and, FIG. 6 illustrates a system for video reverse, as utilized in the present invention.

DETAILED DESCRIPTION

As will be described, the subject system offers the user the full capability to create, edit and manage a graphics data base in which sufficient local storage is provided so that there is no reliance on a separate computer.

Figure 1:
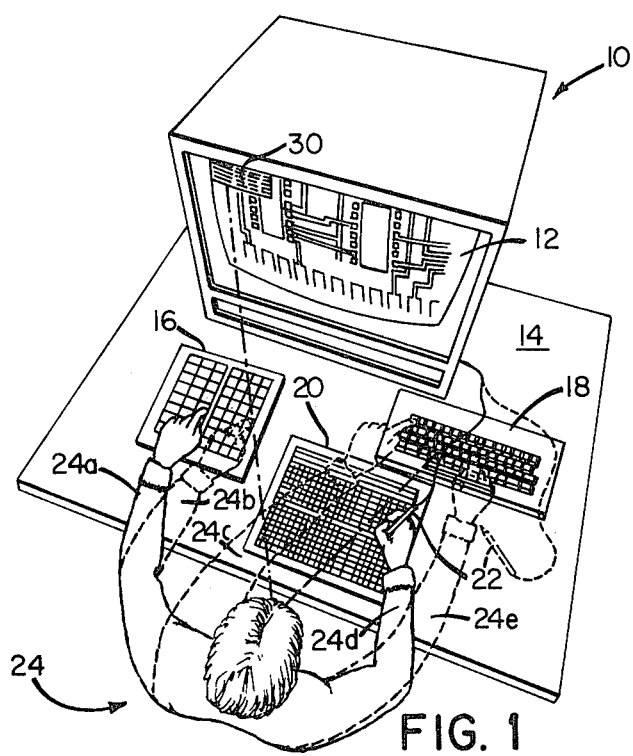
FIG. 1 is a diagrammatic representation of a prior art computer aided design system illustrating not only pen selection but also two different types of keyboard entry devices which result in a lack of man-machine matching, and both eye and arm fatigue.

As mentioned, in the prior art computer graphic systems, geographically separate input locations are utilized in the composing and creation of a graphic design. One such prior art system is illustrated in FIG. 1 in which a graphics terminal is provided with a composing screen 12 and a workspace 14 immediately below the screen which is divided into geographically separate input locations at which are located devices 16, 18 and 20. Inputting device 16 may include a keypad for entering numerals, whereas the device at 18 may be a conventional typewriter keyboard for entering alphabetic characters. A tablet 20 is provided in which a menu of functions and symbols is displayed in terms of manual overlays. A function or symbol may be selected by an electronic pen 22. In addition, location of the graphical elements such as a circle, line, or symbol is controlled by switching the tablet 20 into a cursor track mode and using tablet 20 and electronic pen 22 to control the movement of the element on screen 12.

An operator 24 provides input to the computer driving the display by virtue of actuating switches at the keypad, typing in information at the keyboard, or selecting mode, function or symbols at the tablet. As illustrated, operator 24 must use both hands during the inputting sequence such that the left hand moves between geographically distinct work stations as illustrated by arm movements $24_a$, $24_b$ and $24_c$. Menu picks are achieved by the right hand as illustrated at $24_d$. The right hand may also be used to actuate any one of the other inputting devices such as illustrated at $24_e$.

As can be seen, not only can there be considerable arm movement between geographically distinct workspaces, or work stations, but also there is the possibility of errors due to the awkwardness of having to use the non-drawing hand for a complex task.

Moreover, there exists a certain amount of mental gymnastics to translate between, for instance, moving a symbol on the screen in a given direction and describing the coordinates of the move in terms of keyboard entry numbers or alphabetic characters. Because several input areas are involved, the operator experiences the added mental strain of deciding which is to be used for each input function. Such an inputting system is both cumbersome and results in physical and mental fatigue which not only reduces the speed at which an operator can create his design, but also results in a certain amount of resentment from having to learn new skills.

In some types of prior art systems, there is continuous user feedback in the form of an alphanumeric display which is sometimes positioned as illustrated at 30 somewhere on the graphics CRT. While continuous user feedback is indeed desirable, it is highly undesirable to place this feedback indication in a position different from the data input entry position because the user must shift his eyes back and forth between the graphic display and the input entry devices, usually on a constant basis. Also, the feedback changes rapidly in contrast to the quasi stationary design on the graphics screen. When the two appear adjacently or superimposed on the graphics screen, excessive eyestrain is developed due to involuntary eye movement between the created design and the feedback indication. The reason that this continuous feedback is important is so that the operator can instantaneously check the inputs which he is making. Establishing the correspondence between the continuous feedback and what an operator must do at a geographically distinct and removed workspace requires a constant glancing up and glancing down which is tiring and often times leads to confusion and error.

Figure 2:
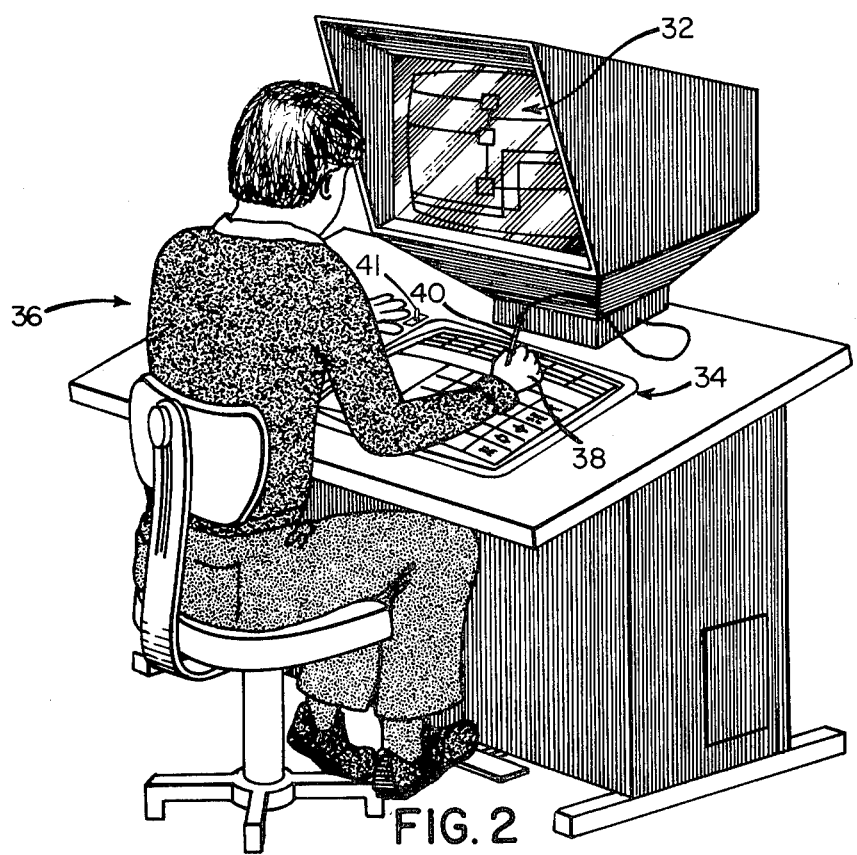
FIG. 2 is a diagrammatic illustration of the subject invention, illustrating a graphics screen and a function screen, showing the single work space operation.

Referring now to FIG. 2, in contrast to the prior art systems, the subject system includes dual screens CRTs 32 and 34 in which screen 32 is a graphics screen and 34 is a function screen. This function screen provides in a unitary workspace the functions previously distributed between units 16, 18, 20 and 30 of FIG. 1. Unitary function screen 34 provides the operator with an interactive display in which an operator 36 can with a single hand 38 movement provide all of the necessary inputs via a light pen 40 interacting with the data selectively displayed on screen 34. It will be appreciated that screen 34 defines a single workspace which minimizes the physical movement, and eliminates the need to switch operator attention from one workspace to another. If desired the switch from input to cursor track mode may be accomplished by light pen selection. Alternatively toggle switch 41 may be provided at the single workspace. Thus the system does not require complicated two-handed operation and all of the alphabetic, numeric and function selections are displayed at 34 in an order which may be determined by the operator or may be preset so as to give an orderly flow to the instructions to be entered into the computer.

What is displayed at the function screen is first a format block to initialize the system through light pen selection. This is followed by an entire menu of symbols and functions which the operator may wish to utilize. If desired, a simulated keyboard may be displayed at the screen, which the operator may actuate solely by utilization of the light pen.

It should be pointed out that by utilization of an interactive light pen function screen, the formats and menus may be easily and rapidly changed and presented to the designer to give the system dynamic capability. Thus for instance, if the pre-programmed menus are not to the operator's liking for a particular task, he may design his own menu, have it displayed to him in whatever order he likes and change it, interleaf it, go from one menu to another, all with the positioning of the light pen and therefore provide for himself at a single workspace all of the data inputting capability required for flexibility in drafting. While in the prior art it is sometimes necessary to provide a separate tablet overlay, align it, and then indicate to the machine which overlay is being used, the function screen may be utilized for an instantaneous call-up of whatever overlay is desired. Note that no time consuming overlay is necessary when utilizing the interactive function screen as the inputting device.

Additionally a portion of the function screen may be utilized for continuous user feedback such that the operator's eyes need not leave the single workspace in order to ascertain whether his input is in conformity with the computer programming or whether it is correct for the type of input being done. This results in faster more efficient data entering. The use of the function screen permits instantaneous call-up of library listings, the utilization of the function screen in a cursor mode to be able to move symbols on the graphics screen without inputting coordinates, as well as providing a complete editing capability, all at a single workspace.

Figure 3:
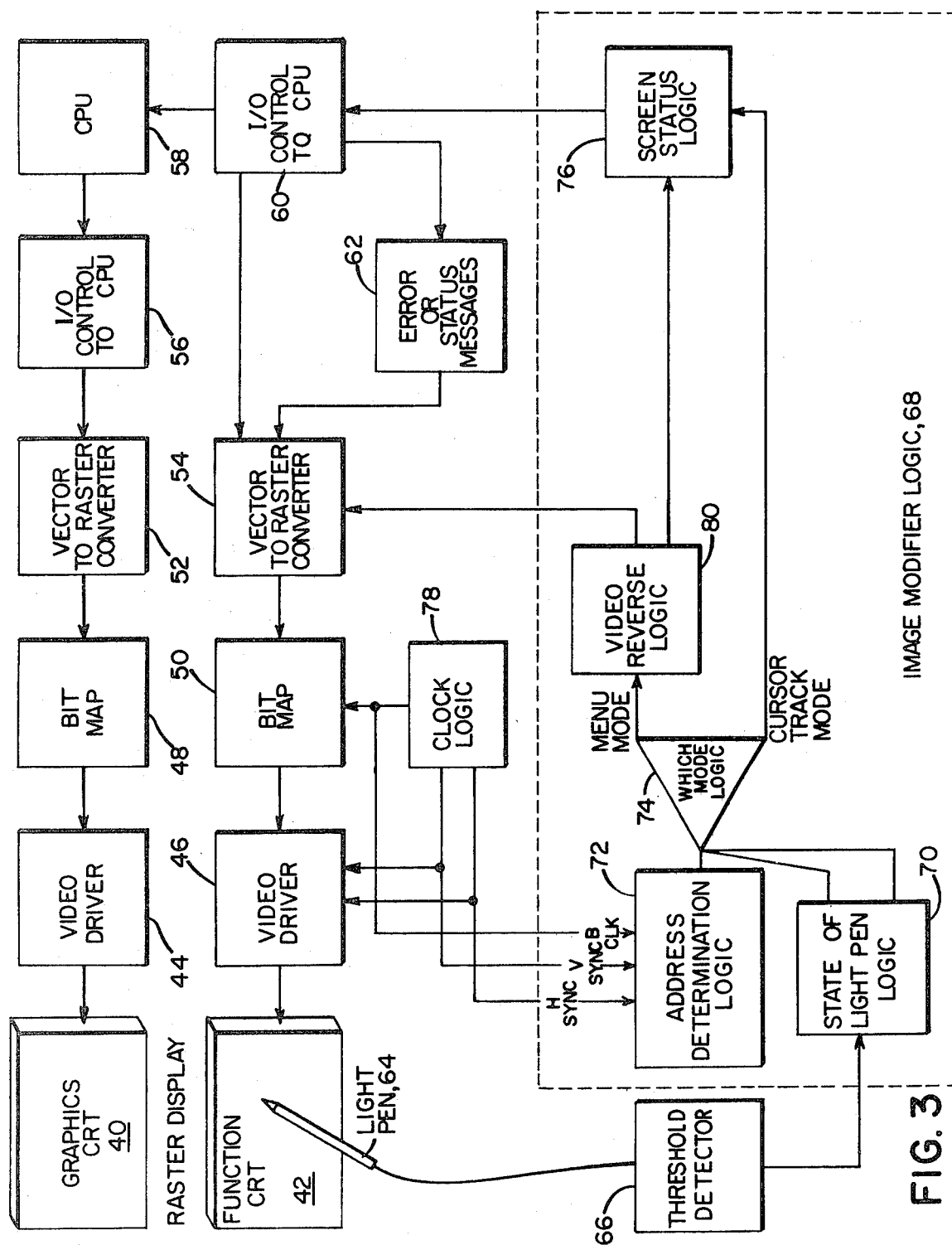
FIG. 3 is a block diagram of one embodiment of the subject system indicating the drive circuitry for the graphics screen and the function screen.

Referring now to FIG. 3, a block diagram of one embodiment includes a graphics screen CRT 40 and a function screen CRT 42 each driven by conventional video drivers 44 and 46, conventional bit map units 48 and 50 and conventional vector-to-raster scan converters 52 and 54. Graphics CRT 40 is provided with an input/output control unit 56 which is coupled to a central processing unit (CPU) 58, whereas function CRT 42 is coupled to CPU 58 via an input/output control unit 60 coupled either directly to converter 54 or through an error or status message unit 62 to this converter.

A light pen, electronic pen, or other pointing means 64 is utilized in connection with function screen 42 and is coupled to a threshold detector 66 which is in turn coupled to an image modifier logic unit 68. A unit 70 within image modifier logic unit 68 determines the state of the light pen and in connection with address determination logic 72, determines the selection made by the light pen.

It will be appreciated that the function CRT can operate either in a pick mode for menu selections or can operate in a cursor track mode for the purpose of moving around symbols on the graphics CRT 40. Regardless of the mode identified by logic mode block 74, screen status logic 76 calls forth from the CPU either the menu required or directs the CPU to display on the graphics CRT that which is described in terms of the picks at the function CRT.

Should a given menu pick be in error or should it be desirable to display a given status message, this is called forth from the CPU and is displayed on the function CRT.

Address determination logic is synchronized with respect to the scanning of the raster of the function CRT by virtue of the utilization of a logic clock 78 which provides H sync, V sync and B clock signals to the units indicated. This permits a correspondence between the location of the light pen and the identity of or address of the displayed information referred to by the light pen.

In the menu pick mode a video reverse logic unit 80 may be provided, the output of which is coupled to the vector-to-raster converter for providing an image reversal for the picked information displayed on the function CRT. This means that black symbols may be converted to white symbols or vice versa to indicate upon a menu pick which pick has in fact been detected. This, in addition to the error or status messages, gives the operator immediate feedback as to the pick which he has made, and its correctness. As will be described, with a point and pick system in which entry is only made after removal of the light pen, the system increases the accuracy of a menu pick in a constant feedback positive actuation type system.

It will be appreciated that whatever processing need be done either to drive the graphics CRT or the function CRT, may be done either at the image modifier logic block 68 in terms of screen status logic or at the CPU depending on the complexity of what is to be displayed at the function CRT and the graphics CRT.

It will be appreciated that in the system illustrated, it is convenient to utilize vector logic, that is going from one coordinate to another coordinate by means of describing a vector, and then to convert this into a signal which is portrayable in a raster scan format. Thus, for instance, it is possible in the subject system to specify coordinates, end points and vectors, should such be desirable. More importantly however, in the cursor track mode, it is possible to display a symbol and move it around by virtue of utilizing the interactive function CRT so that the operator need not have either the responsibility of or the knowledge to convert design characteristics into mathematical coordinates and vector functions. This provides for a true correspondence between man and machine in terms of the types of input an operator would normally utilize. It also provides him with his usual single workspace at which he can concentrate and at which he can get immediate feedback with a minimum amount of effort.

Prior to describing one typical situation in which the computer aided graphics system is useful, it will be appreciated, that raster scan devices may be conceived of as being divided into for instance 512 scan lines going horizontally separated by 512 vertical lines corresponding to 512 different time positions during a single scan. There are therefore, 512×512 possible data points or picture elements (pixels) for displaying whatever symbols or lines are to be displayed. If a line is, for instance, to be drawn between a point having coordinates X1, Y1 and a point having coordinates X2, Y2, then by specifying the end points of the line, the vector-to-raster converter algorithm can instruct the bit map as to which of the pixels to turn on at what time. This means that the algorithm in the bit map, when driven by the vector-to-raster converter, in effect designates the position at which the line will appear on the CRT. This is done by ascertaining which pixels across the CRT will be either extinguished or illuminated by the electron beam, and instructs the video driver when in a given sweep the electron beam is to be turned on or turned off.

A typical operation for an operator and one of ultimate simplicity is the task of inserting a line between two points. In order to accomplish this, typically the graphics display is blank and it is there encumbant upon the operator to initialize the system. In order to initialize this system, the storage portion of the CPU is read into the bit map via the input/output unit and converter while a command is made to blank the graphics screen. A pick is made at the function screen via the light pen. This pick is sensed by the threshold unit which determines not only the position of the pen, but also when the pen is lifted thereby indicating a positive selection. This instructs the CPU as to the type of operation to be executed and the function screen then changes so as to portray the fixed portion with the remainder of the screen going white. In one mode, the operator then indicates that he wants a line to be drawn, changes to a cursor tracking mode and indicates the beginning of the line by placing the light pen at a position on the function screen. He then moves the light pen to the end point of the line on the function screen and the line is drawn therebetween on the graphics screen. Alternatively, he could utilize the menu pick mode and enter into the simulated keyboard the coordinates of the start point and end point at which point the CPU would be read out and converted such that the designated line would be appropriately displayed on the raster scan graphic CRT.

Figure 4A:
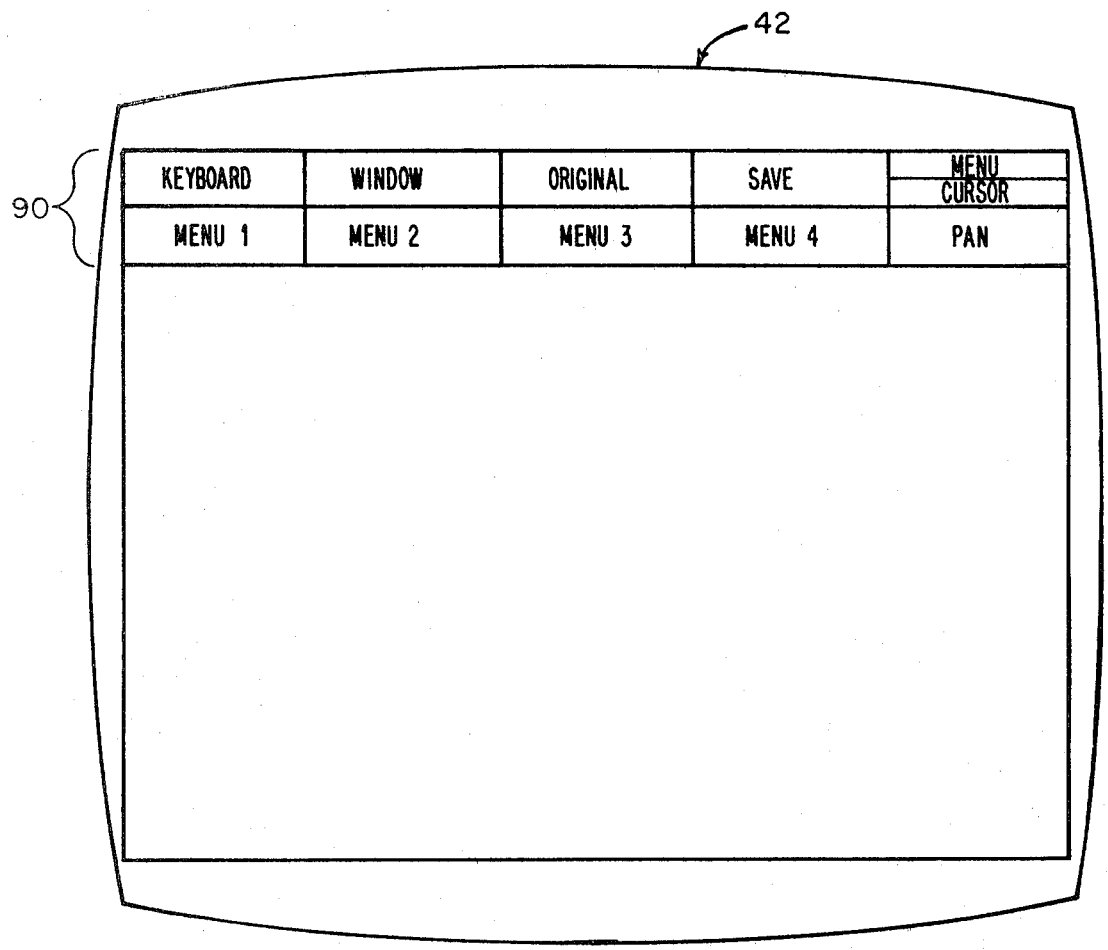
FIGS. 4A–4D illustrate a simulated keypad and one of the menus which may be sequentially displayed on a function screen for one type of graphics creation.

Referring now to FIG. 4A, function screen 42 may initially display a fixed block 90 in which any one of a number of menus may be chosen, keyboard entry may be selected, whether a menu or cursor function is desired, to be selected by logic 74, whether a menu is to be created anew, or whether some particular function or menu is to be saved. In addition a "pan" selection block may be utilized to pan through the various menus in order for the operator to ascertain what menus have been loaded into the system.

The term "window" refers to a magnification function in which a portion of the designated picture is selected and the selected portion is magnified so as to fill the entire graphics screen area.

Figure 4B:
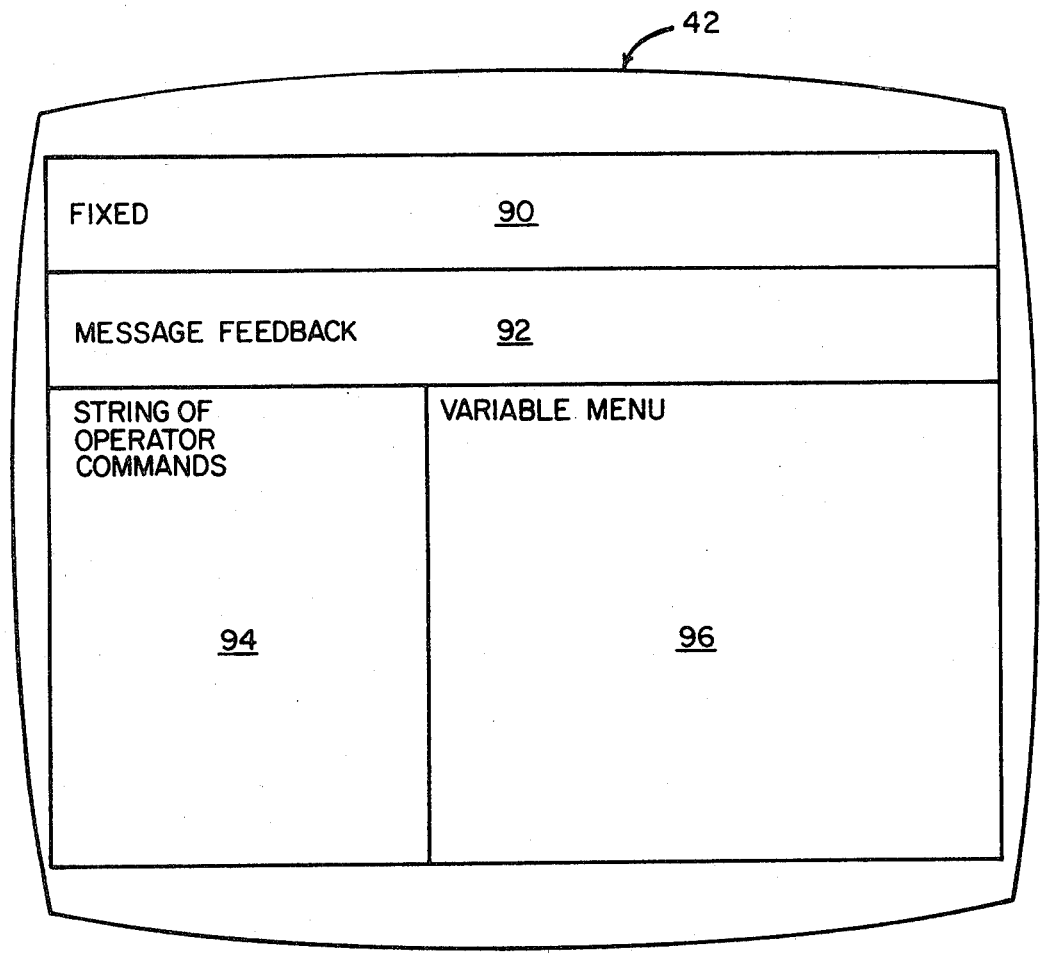

Referring to FIG. 4B, a blank message feedback block 92 may be displayed under the fixed feedback block. Under and to the left of the fixed feedback block and to the left of which may be a block 94, at which a string or list of operator commands may be displayed. To the right of this block may be a variable menu 96. What is actually displayed may take the form shown in FIG. 4C, in which the original fixed format may be as illustrated in FIG. 4A, and in which the various instructions may be as illustrated at 94, with the variable menu now indicating certain symbols which may be selected at column 100, certain functions which may be required as illustrated at column 102 and certain parameters which may be specified as illustrated at column 104. Referring to FIG. 4D, after a pick or selection, a message feedback is indicated. This may include, for example, coordinates of a given line, line width, and line length which can give the operator some indication of whether or not his particular selections are meaningful and have in fact been entered.

With respect to the string of operator commands, they are described as follows for the situations in FIGS. 4C and 4D.

Figure 4C:
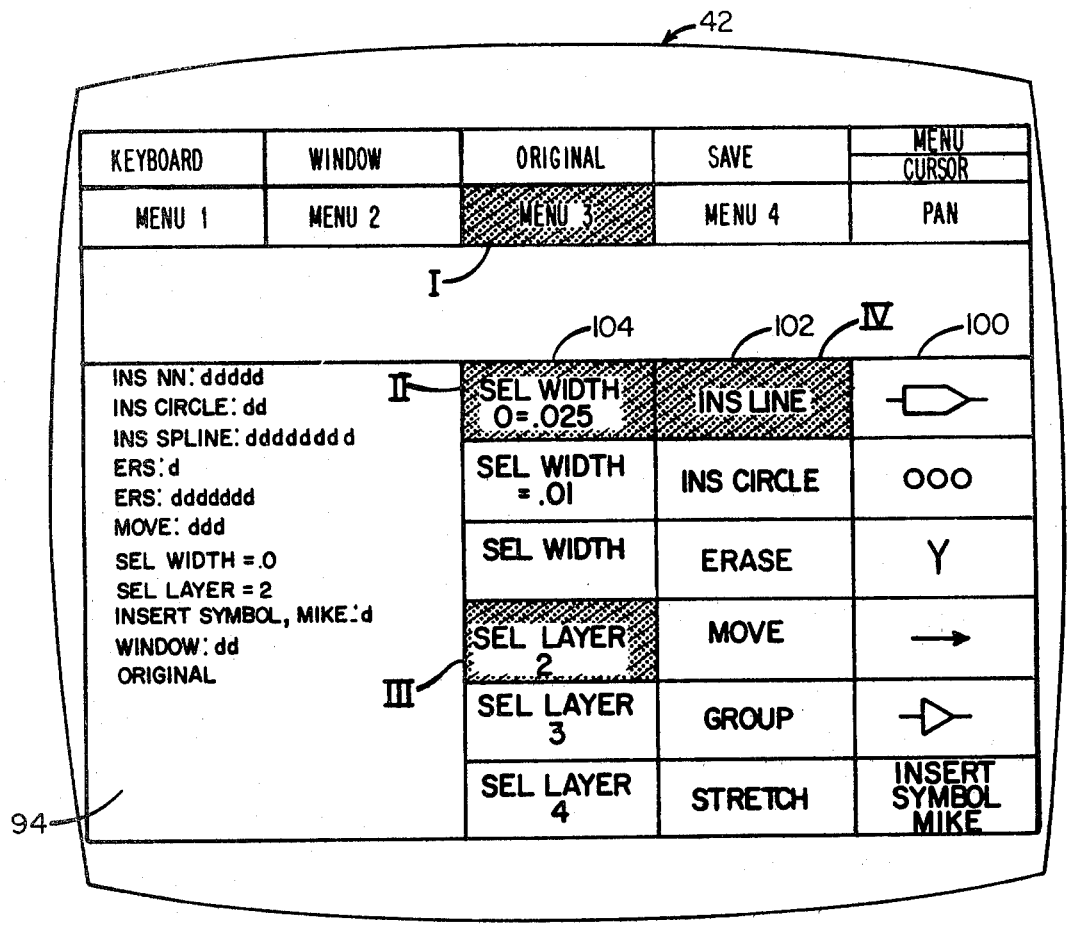
Figure 4D:
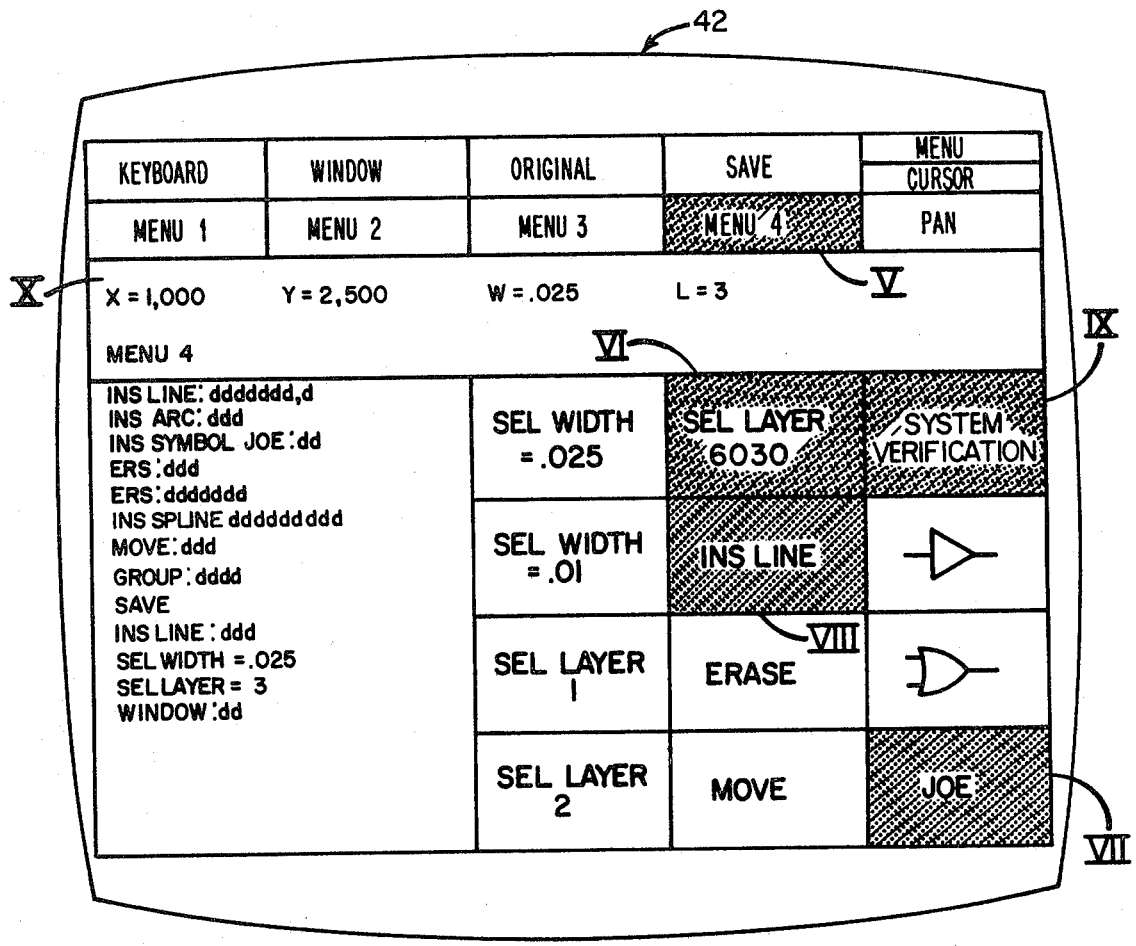

Assuming that the results the operator wishes to obtain are to draw lines in two layers of a printed circuit mask and label the work, referring to FIG. 4C, after having selected menu 3, a line width of 0.025 inches is selected along with an "insert a line" command after which two designated points are specified in layer 2 of an overlay for a printed circuit mask. Referring to FIG. 4D, the operator would then select menu 4, place the components on layer 3, insert a symbol named "Joe" and then insert a line between two different points and ask for a verification of the status of the system.

The actions to be taken by the operator would be to sequentially point to the command blocks of the various menus in the following order:

The first step, I, would be a menu 3 pick, the effect of which would be that the menu 3 block would be video reversed and the contents of menu 3 would appear in the lower portion of the function screen.

The operator then, in step II, selects a line equal to 0.025 with the result that all subsequent lines will have an associated width of 0.025 inches.

In step III, the operator selects layer 2, with the result that all components are placed on layer 2 of the document.

For step IV, the operator instructs the machine to insert a line between $d_1$, $d_2$ with the result that the system is instructed to place a line between the two indicated points $d_1$, $d_2$. These points may be specified by switching to a cursor mode and then positioning the pen at the desired points. When the function screen goes into the cursor mode which is all white, the operator may designate the desired points.

Step V includes a menu 4 pick which results in the screen being configured as shown in FIG. 4D.

Step VI requires the operator to select layer 3 which results in changing the selected layer to layer 3.

In step VII, the descriptor Joe is chosen and $d_3$, in a cursor mode, describes where this is to be placed. The effect is a condensed representation of commands to insert a symbol named Joe at location $d_3$.

Switching back to the function mode again, in step VIII, the insert line block is selected followed by switching back to the cursor mode so that the $d_4$, $d_5$ points may be specified. This commands the system to place a line between the designated points $d_4$ and $d_5$.

In step IX, the system verification block is selected which results in a condensed command requesting a status report.

As an automatically initiated step X, the status report is displayed as a feedback function showing the x,y location to be 1.000, 2.5000; the line width to be 0.025 inches; the layer to be layer 3; and the menu to be menu 4.

Referring now to FIG. 5, a light pen hit/lift circuit is described in which a rastor display 110 has associated with it a light pen 112 which is coupled to a light detector 114, the output of which is coupled to a preamplifier 116. The output of preamplifier 116 is coupled to a Schmidt trigger circuit 118, the output of which is coupled to a differentiator 120, which is in turn coupled to a one-shot multivibrator 122 which provides an indication of a hit. The output of differentiator 120 is also coupled to the reset terminal of a flip/flop 124 having a V sync signal applied to the set input of this flip/flop. The output of the flip/flop is applied to a two terminal AND gate 126 having as its other input an end of scan pulse.

The output of AND gate 126 is applied to an n stage counter 128, the outut of which is applied to an additional one-shot multivibrator 130. The output of one-shot multivibrator 130 indicates a pen lift. Note that the output of differentiator 120 is a downwardly projecting spike 132 which operates to reset flip/flop 124 and counter 128.

In operation, the rastor display scan is initiated by the V sync pulse, here illustrated at 140. When the scan is completed, an end of scan pulse 142 is generated. Light pen 112 has associated with it light detector 114 which is actuated by the spot of light from the rastor scan. The detected signal is amplified by 116 to provide a pulse which is detected by Schmidt trigger 118 that functions as a threshold detector. The output is differentiated so as to provide a leading edge signal on which to trigger a number of devices.

On each scan, flip/flop 124 is set. If the flip/flop has not been reset by the detected light signal, the end of scan signal is counted by counter 128. After n subsequent scans, a lift signal is generated.

Therefore, a "hit" is defined as the occurrence of a light pulse signified by pulse 148 being applied to differentiator 120. When the pen is removed from the surface or near the surface of the CRT screen, no more light pulses will be detected. A "lift" is the condition where the state of n missing consecutive light pulses is detected. In one embodiment, if once having a "hit" there occurs n end of scan pulses without another "hit" then a lift signal is generated.

It will be appreciated that a hit followed by a lift indicates that a positive selection has been made and this signal may be coupled to the remainder of the system to indicate a positive choice.

In short, a lift is indicated by a hit followed by the absence of n hits for a predetermined number of scans as indicated by end of scan pulses clocking counter 128 without a reset pulse.

With respect to the video reverse portion of the subject invention, in a rastor display, the picture is displayed in such a fashion that either the image is considered white on a black background or is black on a white background. The picture is composed of a series of dots or pixels, the position of which on a bit map 150 is indicated in FIG. 6 as occurring within a window 152 having diametrically opposite corners $X_1 Y_1$ and $X_2 Y_2$. In displaying any picture, the control logic has precise knowledge of the pixel being instantaneously displayed. Using straightforward logic functions, the decision function can be constructed so as to compare the address of the pixel being displayed with the address of window 152. When the displayed pixel is within the prescribed window, the control logic is made to invert the style of presentation. That is the style of presentation within the window is changed from all white elements or pixels to black and all black elements or pixels to white. If the displayed pixel is outside the prescribed window, the control logic displays the pixels in an unmodified form.

Thus, for control logic 154, serial data on line 156 may have the form illustrated at 158. Non-inverted data is illustrated at 160, whereas inverted data is illustrated at 162. The x,y bit addresses for the data to be reversed is applied on line 164 such that if the data bit address is such that $X \geq X_1$, and $Y \leq Y_1$, then all pixels are inverted until either $X = X_2$ or $Y = Y_2$.

It will be appreciated that a multiplicity of areas can be video reversed at one time and furthermore that the area to be video reversed need not be defined by a simple rectangle but can rather be defined by any irregular shaped boundary.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A computer aided design system for creating a design on a graphics screen by instructions entered through a separated function screen comprising:

a work station having a work surface including within said surface a function screen and further having, extending vertically above said surface, a graphics screen, separate from said function screen, for displaying a design in creation;

means for driving a portion of said function screen to display a mode selection including a selection of a keyboard mode, a position denoting mode and plural other modes for symbol and associated parameter selection and for driving other portions of said function screen with selectable design information associated with a selected mode;

point and pick means for selecting a point and corresponding mode or associated design information on said function screen;

means responsive to selection of a point on said function screen portion corresponding to one of said mode selections for changing the display mode of said function screen to produce a display enabling point and pick selection of information corresponding to the mode selected wherein, the selection of the keyboard mode results in the display of a simulated keyboard from which point and pick selection of keyboard character design information may be made, and the selection of the position mode results in the availability of the function screen to be used to select position design information thereon with said point and pick means that designates corresponding positions on the graphics screen, and wherein the selection of one or more symbol selection modes by said point and pick means results in the function screen displaying selections of graphic element design information and parameters associated therewith;

said system further including a means for producing design displays on said graphics screen in response to mode and associated design information selections made through said function screen by operation of said point and pick means.

2. The system of claim 1 wherein said point and pick means includes a pen adapted to be placed on said function screen and means for inhibiting a selection by said pen until said pen has been maintained at one location on said screen and then has been removed for a predetermined period of time.

3. The system of claim 1 wherein said function screen drive means includes means for video reversing on said function screen information which has been selected.

4. The system of claim 1 wherein said function screen drive means includes means for displaying on a selected portion of said function screen as indication of prior selections.

5. The system of claim 1 wherein said means for driving said graphics screen includes means for selecting by said point and pick means a cursor track mode to enable the moving of a symbol generated on said graphics screen in accordance with movement of said point and pick means across said function screen.

6. The system of claim 1 wherein said function screen drive means includes means for displaying on a selected portion of said function screen, within a fixed information area, menus selected by prior selections of said point and pick means.

7. The system of claim 6 wherein said means include among said symbols, graphic elements indicating components to be displayed on said graphics screen.

8. A computer aided design method for creating a design on a graphics screen by instructions entered through a separated function screen comprising, the steps of:

driving a portion of a function screen located within a surface of a work station with a portion displaying a mode selection including a selection of a keyboard mode, a position denoting mode and plural other modes for symbol and associated parameter selection and driving other portions of said function screen with selectable design information associated with a selected mode;

selecting by point and pick means a point and corresponding mode or associated design information on said function screen;

responding to selection of a point on said function screen portion corresponding to one of said mode selections to change the display mode of said function screen to produce a display enabling point and pick selection of information corresponding to the mode selection, wherein the selection of the keyboard mode results in the display of a simulated keyboard from which point and pick selection of keyboard character design information may be made, and the selection of the position mode results in the availability of the function screen to be used to select position design information thereon with said point and pick means that designates corresponding ppositions on the graphics screen, and wherein the selection of one or more symbol selection modes by said point and pick means reslts in the function screen displaying selections of graphic element design information and parameters associated therewith;

said method further including the step of producing design displays on a graphics screen extending vertically above said surface in response to mode and associated design information selections made through said function screen by operation of said point and pick means.

9. The method of claim 8 and further including the steps of presenting status messages on the function screen, whereby an operator need not glance elsewhere to establish an input or the correctness thereof.

10. The method of claim 8 and further including the step of video reversing on the function screen information which has been selected by the pen pick means, thereby to provide instantaneous feedback to an operator.

11. The method of claim 8 wherein the selecting step is only operative to select information from the function screen after the pen has been located on the function screen and has then been removed from the function screen for a predetermined length of time.

* * * * *